United States Patent
Dufrene et al.

(10) Patent No.: US 7,840,992 B1
(45) Date of Patent: Nov. 23, 2010

(54) SYSTEM AND METHOD FOR ENVIRONMENTALLY AWARE DATA PROTECTION

(75) Inventors: Rene Dufrene, Heath, TX (US); Anthony D. Fong, Norton, MA (US)

(73) Assignee: EMC Corporation, Hopkinton, MA (US)

( * ) Notice: Subject to any disclaimer, the term of this patent is extended or adjusted under 35 U.S.C. 154(b) by 956 days.

(21) Appl. No.: 11/536,088

(22) Filed: Sep. 28, 2006

(51) Int. Cl.
 G06F 17/00 (2006.01)
 G06F 7/04 (2006.01)
(52) U.S. Cl. .......................................... 726/1; 726/26
(58) Field of Classification Search .................. 726/26, 726/1; 707/204, 640; 711/162; 713/193; 714/20
See application file for complete search history.

(56) References Cited

U.S. PATENT DOCUMENTS

| 6,496,949 | B1 | 12/2002 | Kanevsky et al. |
| 6,879,931 | B2 | 4/2005 | Smith et al. |
| 6,925,409 | B2 | 8/2005 | Smith et al. |
| 6,981,115 | B2* | 12/2005 | Yamagami et al. ........... 711/162 |
| 7,299,326 | B2* | 11/2007 | Lin et al. ..................... 711/162 |
| 2002/0066034 | A1* | 5/2002 | Schlossberg et al. ........ 713/201 |
| 2006/0126501 | A1* | 6/2006 | Ramaswamy ............... 370/221 |
| 2009/0216969 | A1* | 8/2009 | Winokur ..................... 711/162 |

\* cited by examiner

Primary Examiner—Emmanuel L Moise
Assistant Examiner—Ali S Abyaneh
(74) Attorney, Agent, or Firm—Guerin & Rodriguez, LLP; Michael A. Rodriguez

(57) ABSTRACT

Described are a system and method for providing data protection. A storage management system in communication with first and second storage arrays is configured to implement a data protection procedure for protecting data stored in the first storage array using the second storage array. An environmental information processor receives information related to an event that can threaten the data stored in the first storage array and, based on the received information, issues a command to the storage management system. The command causes the storage management system to initiate the data protection procedure as a precautionary action for protecting the data stored at the first storage array.

16 Claims, 4 Drawing Sheets

SYSTEM AND METHOD FOR ENVIRONMENTALLY AWARE DATA PROTECTION

FIELD OF THE INVENTION

The present invention relates generally to storage systems. More particularly, the present invention relates to systems and methods of invoking data protection in response to threatening environmental situations.

BACKGROUND

To many of today's enterprises, continuity of business operations is vital. Strategies for protecting business-critical data against local or widespread disaster abound. Such strategies include backup and recovery strategies and disaster recovery strategies. Backup and recovery strategies generally involve frequent, regularly scheduled procedures for backing up critical data. Typically, copies of backups are maintained locally to facilitate rapid restoration of lost or corrupted files or data. In contrast, disaster recovery strategies address situations of complete loss or inaccessibility to the entire data center of the enterprise, including all data files, application programs, and stored backups. Disaster recovery generally entails replicating the information stored at the data center and transmitting it to a data center at a remote location.

To implement backup and recovery strategies and disaster recovery strategies, many software products are commercially available. An example of a software product for non-disruptively generating local copies of data for backups is TimeFinder®, produced by EMC Corporation of Hopkinton, Mass. Remote replication capabilities may be accomplished through software products such as Symmetrix Remote Data Facility® (SRDF) and MirrorView®, also produced by EMC Corporation.

For business-critical data, an enterprise's information technology (IT) department typically arranges to have local backups performed frequently and remote replication performed continuously (i.e., synchronously, in real-time). Replication of other, less critical categories of data typically occur on a scheduled basis (i.e., asynchronously), often after business hours, to capitalize on lower pricing for bandwidth use. Business operations can continue to use the data in the storage system throughout the replication process. The unpredictable nature of natural and manmade disasters, however, can jeopardize an enterprise by striking at a moment when all data has yet to be replicated and moved to a remote location.

Industry has recognized this vulnerability and devised a solution for servers and personal computers. The solution entails environmental sensors, disposed locally to these machines, which signal an impending local disaster. Each server and personal computer capable of interpreting such warning signals pushes its data, as an incremental or full backup, to a corresponding server or computer situated at a safe distance from the disaster.

Problems inherent with this solution, however, present themselves when the disaster extends farther than the servers and computers are able to move their data in accordance with their data evacuation floor plans. Moreover, local area networks to which the machines are interconnected may not be able to support the flood of data from the many servers and computers individually contending for the limited bandwidth in their urgent attempt to preserve their data. The situation becomes dire for any server or computer that is offline when the disaster occurs, there being no opportunity to save its data. Further, the added cost of equipping servers and computers with the capability of interfacing and interpreting signals from environmental sensors would limit the use of this mechanism to those machines having data deemed worthy of the added expense.

SUMMARY

In one aspect, the invention features a data protection system comprising a first storage array and a second storage array and a storage management system in communication with the first and second storage arrays. The storage management system is configured to implement a data protection procedure for protecting data stored in the first storage array using the second storage array. An environmental information processor receives information related to an event that can threaten the data stored in the first storage array and, based on the received information, issues a command to the storage management system that causes the storage management system to initiate the data protection procedure as a precautionary action for protecting the data stored at the first storage array.

In another aspect, the invention features a computerized method for implementing data protection for data stored at a storage array situated at a physical location. The computerized method comprises receiving information related to an event that may endanger data stored at the storage array. In response to the received information, a command is issued to a storage management system instructing the storage management system to perform a precautionary action. The precautionary action is implemented by the storage management system in response to the command, to protect the data stored at the storage array.

In another aspect, the invention features a computer program product for use with a computer system. The computer program product comprises a computer useable medium having embodied therein program code: (1) for processing information received over a network and related to an event that may endanger data stored at a storage array; and (2) for issuing, in response to the received information, a command to a storage management system instructing the storage management system to perform a precautionary action that protects the data stored at the storage array.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

In general, data protection systems embodying the invention are able to detect developing environmental situations that threaten data stored in a storage array and to take precautionary measures to protect that data before disaster strikes. An environmental information processor continuously receives environment-related information from an environment monitoring system. From this received information, the environmental information processor determines whether the data in the storage array is at risk and assesses the severity of the threat. Depending upon the threat's severity, the environmental information processor selects a precautionary action to invoke in order to protect the data in the storage. Through issued commands, the environmental information processor instructs a centralized storage management system to perform the precautionary action. The centralized storage management system implements one or more data protection procedures, such as backup, snapshot, asynchronous and synchronous remote replication, cluster failover, as described below, to make the threatened data (at least prioritized data) available at an alternative location, thus facilitating continuity of business operations and disaster recovery. The particular procedure (or procedures) implemented are based on any one or combination of data protection policy, time remaining before disaster strikes determined from heuristics received from the alerts, and manual intervention. System messages generated to invoke a precautionary action can be sent to remote operators who have the ability to intervene or override. Accordingly, practice of the invention can be used to overlay an increased level of data protection on an enterprise's existing business continuity and disaster recovery practices by automating processes for monitoring, prioritizing, and invoking precautionary actions automatically based on perceived threat and its urgency, as described further below.

Figure 1:
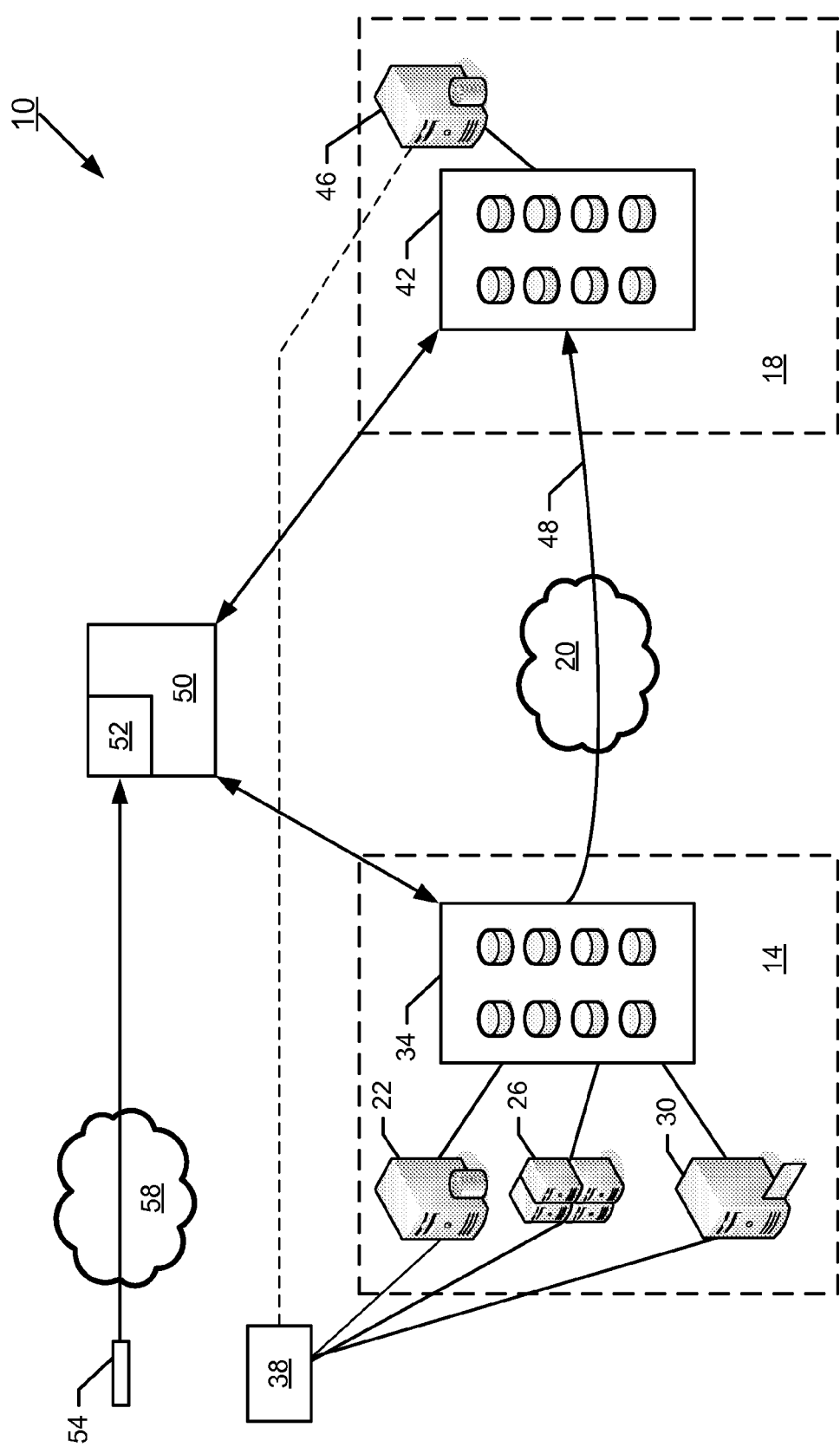
FIG. 1 is a functional block diagram of an embodiment of a data protection system embodying the principles of the invention.

FIG. 1 shows an embodiment of a data protection system 10 constructed in accordance with the invention. The data protection system 10 includes a first data region 14 in communication with a second data region 18 over a network 20. The first data region 14 includes a variety of computing systems including, as illustrative examples, a database server 22, an application server 26, and an email server 30. The first data region 14 can also have a myriad of other computing devices not shown in FIG. 1, such as personal computers, workstations, mainframes, laptops, hand-held devices, etc., without departing from the principles of the invention. The first data region 14 also includes a storage array 34 (also known as a storage system).

Each of the computing devices 22, 26, 30 is in communication with the storage array 34 for locally storing data related to the application programs and other processes running on those devices. As illustrated, an end-user 38 is in communication with each of the computing devices 22, 26, 30, e.g., for purposes of running its enterprise operations. Data stored in memory local to each computing device 22, 26, 30 may also be copied to the storage array 34. In general, data may be organized within the storage array 34 according to the particular servers accessing that data; e.g., the database server 22 accesses certain volumes, the application servers 26 access other certain volumes, and the email server 30 accesses still other certain volumes.

The second data region 18 includes a storage array 42 and, optionally, a database server 46. The storage array 42 stores data replicated from the storage array 34 in the first data region 14. Exemplary implementations of the storage arrays 34 and 42 include SYMMETRIX® and CLARiiON® data storage arrays, commercially available from EMC Corporation. It is to be understood that the principles of the invention apply to other types of storage arrays, whether produced by EMC or other storage system manufacturers, and to homogenous and heterogeneous storage system infrastructures (i.e., the primary and secondary storage arrays do not need to be from the same manufacturer).

Preferably, storage array 42 is at a remote (i.e., distant) location with respect to the storage array 34. For example, if the storage arrays 34, 42 are engaged in synchronous remote data replication (e.g., SRDF/S), the storage arrays 34, 42 may be separated by several hundred kilometers. In synchronous replication mode, the primary storage array waits until the secondary storage array acknowledges each write before the next write is accepted. Waiting for the acknowledgment ensures the replicated copy of the data is always as current as the data stored at the primary storage array. If the storage arrays 34, 42 engage in asynchronous replication (e.g., SRDF/A), the distance of separation is unlimited. Asynchronous SRDF transfers data to the secondary storage array in delta sets. These delta sets are transferred at scheduled intervals. The remote copy of the data at the secondary storage array may not be as current as the data at the primary storage array.

Although described herein with only one primary storage array 34 in the first (local) data region 14 and only one secondary storage array 42 in the second (remote) data region 18, it is to be understood that the principles of the invention may be practiced with a plurality of storage arrays in either or both data regions, with more than one local data region, and with more than one remote data region. Accordingly, practice of the invention can involve data protection from one primary array to one secondary array, many primary arrays to many secondary arrays, and many primary arrays to one secondary array, depending upon the particular configuration of the data protection system 10.

If the data protection system 10 supports geographically dispersed server clustering, the end-user 38 is also in communication with servers in the second data region 18 (here, e.g., shown in dashed lines as communicating with the database server 46). Server clustering (with failover mechanisms) enables the end-user 38 to continue executing its processes, although its primary data source and data receptacle (here, storage array 34) becomes inaccessible. In the event of a failover, the end-user 38 who previously accessed data in the storage array 34 is redirected to the database server 46, which accesses data stored in the storage array 42. The switchover, if it occurs, is undetectable by the end-user 38. Remote replication processes ensure that the data needed to execute seamlessly reside at the storage array 42 in the second data region 18 when the switchover occurs.

Such storage arrays 34, 42 include various redundant features to ensure that business-critical data are available around the clock. Communication links 48 between the storage arrays 34, 42, in general, are carefully architected with guarantees of sufficient bandwidth for supporting synchronous and asynchronous traffic loads, including emergency traffic loads when faced with an impending threat as described herein. Redundancy (not shown) is often built into the links 48, with service level agreements being negotiated with different carriers, each providing a redundant link between the storage array sites, so that there is no single point of failure nor a single third-party manager of the links.

The data protection system 10 also includes a storage management system 50 that is in communication with the storage array 34 of the first data region 14 and with the storage array 42 of the second data region 18. The storage management system 50 is a processor-based computing system that functions as a centralized management tool through which an administrator can access, manage, and control the storage infrastructure; from a single point of control, the administrator is able to manage and control data movement among geographically dispersed server clusters and among geographically dispersed storage arrays.

Through the storage management system 50, the administrator can implement an enterprise's data protection strategies (e.g., backup, cloning, local and remote mirroring, remote replication, etc.). For example, the administrator may establish remote replication procedures such that the volumes storing business-critical data are synchronously replicated at the remote storage array 42 (i.e., data being written to such volumes in storage array 34 are also written real-time to the storage array 42). The administrator may schedule less-critical data for remote replication after business hours.

For implementing the enterprise's data protection strategies, the administrator can run one or more of the various commercially available software products, e.g., SRDF/A, SRDF/S, TimeFinder®, SnapView® produced by EMC Corporation. Other non-EMC software products for data protection may be used in the practice of the invention. In one embodiment, the storage management system 50 runs a storage management software suite, referred to as EMC Enterprise Control Center® (ECC), to provide storage allocation, monitoring, performance management, administration, and data protection functionality.

Ill-timed natural and manmade disasters, however, can undo the carefully laid data protection strategies and tactics of an enterprise. A disaster that strikes the first data region 14 before a scheduled remote replication procedure can cause irrecoverable loss of data. To mitigate or avoid data loss because of disaster, the data protection system 10 includes an environmental information processor 52 that is in communication with an environment monitoring system 54 across a network 58. The network 58 can be a local-area network (LAN), a metro-area network (MAN), or wide-area network (WAN), such as the Internet or World Wide Web. The network 58 may be separate from, the same as, a subset of, subsume, or overlap the network 20.

In one embodiment, the environmental information processor 52 is incorporated in the storage management system 50, as shown in FIG. 1. In another embodiment, the environmental information processor 52 is a separate processor-based computing system that is in communication with the storage management system 50 (e.g., over a LAN, MAN, or WAN). The storage management system 50 exposes an application program interface (API) to be used by the environmental information processor 52 to submit commands that cause the storage management system 50 to perform the action signified by the command.

The environment monitoring system 54, in general, operates to monitor a particular condition or situation occurring in a physical environment and produces information (in the form of network packets, messages, or signals) about that particular condition. Examples of environmental conditions for which the environment monitoring system 54 may be configured to monitor include, but are not limited to, ocean levels, hurricane tracks, tornado reports, local and regional flooding, fires, forest fires, geomagnetic storms, electrical storms, wind storms, electrical grid outages, temperature, wind velocity, water levels, seismic movement, and sound.

The environment monitoring system 54 includes one or more sensors configured to monitor the particular environmental condition. Such sensors may be local to or distant from the computing systems 22, 26, 30 and storage array 34 in the first data region 14. For example, local sensors can detect threatening events near the computing systems 22, 26, 30 and storage array 34, such as a fire or intruder in the building. As another example, a digital video surveillance system can produce image data that can be used to detect, for example, unattended luggage or packages. Remote sensors can detect threatening weather patterns and other natural phenomena, such as earthquakes and tsunamis. Machines need not be the sole agents in sensing and reporting a developing environmental threat; for example, a human may pull a networked fire alarm upon spotting a fire, or medical personnel may broadcast an alert upon detecting a biological breakout requiring a facility to be quarantined (and data moved to an alternate location).

Messages (or signals) generated by the environment monitoring system 54 can be text messages, video streams or images, analog or digital electrical signals signifying data values (e.g., measured temperature, water level, vibrations), or an alarm signal. For example, the Pacific Tsunami Warning System seeks to detect, locate, and determine the magnitude of potentially tsunami-generating earthquakes that occur in the Pacific Basin. If the earthquake location and magnitude meet certain criteria, a tsunami warning is issued. Included in the warning message are predicted arrival times of any tsunami at coastal communities within the potentially affected geographic area. Dissemination of the warning to the public can include IP (Internet Protocol) packets sent over the network 58 containing text content.

The environmental information processor 52 includes an application program (or, generally, program code) adapted to process environment-related information transmitted by the environment monitoring system 54 over the network 58. Like the sensors of the environment monitoring system 54, the environmental information processor 52 (and storage management system 50) may reside locally or remotely to the computing systems 22, 26, 30 and storage array 34, depending upon the type and location of the environmental condition (s) being monitored. Accordingly, the environmental information processor 52 (and storage management system 50) may or may not be at risk from the environment condition that threatens the computing systems 22, 26, and storage array 34. From some monitored environments, messages may pass directly to or be addressed specifically to the environmental information processor 52. In other monitored environments, messages do not need to be addressed specifically to the environmental information processor 52; the environmental information processor 52 may monitor the network 58 for traffic broadcast by the environment monitoring system 54.

In one embodiment, the environmental information processor 52 includes program code for analyzing the incoming information (which may arrive from multiple sources, i.e., sensors, reporting agencies), program code for determining steps to be taken as a precautionary measure (i.e., according to established policy), and program code for issuing one or more commands to the storage management system 50 to institute the precautionary measure (referred to herein as precautionary action).

Precautionary actions include, but are not limited to, initiating real-time remote replication of data stored in certain volumes of the storage array 34, initiating data backup, telephoning an administrator, and invoking a geographically dispersed cluster failover. The environmental information processor 52 may invoke any one or more of these actions in response to an environmental threat. Remote replication can be used, for example, to copy an entire server image (i.e., the executable framework of the server) to the second data region 18, thereby assisting in recovery from the disaster at the second data region. In the instance of a geographically dispersed cluster failover, the computing devices 22, 26, 30 and storage array 34, although at risk, continue to operate, while operations of the end-user 38 transition to a server and storage array that are remote and presumably safe from the threat. As referred to herein, a geographically dispersed cluster failover is considered a data protection mechanism although the failover executes without data being copied or moved to the secondary storage array (the data already having been replicated at secondary storage array as part of another data protection mechanism).

Notably, the data protection system 10 of the invention does not require the participation of the computing systems 22, 26, 30. At the moment of the impending disaster, any one or all of these systems 22, 26, 30 may be offline. Provided the data of these systems 22, 26, 30 have been stored at the storage array 34, or, in the case of geographically dispersed clusters, stored at the secondary storage array 42, precautionary protection and undisrupted use of such data is achieved by the data protection system 10 of the invention.

To invoke a precautionary action, the environmental information processor 52 issues one or more commands to the storage management system 50. The commands may have a standard protocol format (e.g., IP packets sent over an IP network), or have a proprietary format. By means of these commands, the environmental information processor 52 identifies each precautionary action invoked and each storage array affected. With the identities of the storage arrays, the storage management system 50 pulls (i.e., obtains) the data from the storage array 34 in the first data region 14 and, in the case of remote replication, stores that data in the storage array 42 at the second data region 18.

A decision to invoke to precautionary action by the environmental information processor 52 involves an analysis of the incoming information from the sensors, which may be changing dynamically and rapidly. From the incoming information, the environmental information processor 52 determines the severity of the threat, including assessing the level of potential damage that the threat poses and the amount of time before the threat is expected to affect the storage array 34. For example, from successive water level measurements the environmental information processor 52 can know the height of the water, calculate its rate of rise (or of abatement), and determine how long before the water reaches a potentially destructive level (to the storage array 34). As another example, a message issued by the U.S. Geological Survey (USGS) may warn of a tornado, providing its size, strength, location, direction, and approaching speed. The environmental information processor 52 can parse the USGS message and assess the severity of the threat of the tornado to the storage array 34.

The severity of the threat is a factor in determining which precautionary action (or precautionary actions) to implement. For example, consider a tsunami still hours from reaching the first data region 14; the environmental information processor 52 may invoke immediate remote replication of data to the second data region 18. If, instead, the threat is minutes or seconds from the first data region 14, (e.g., a fire in a neighboring room, rising floodwaters), the environmental information processor 52 may invoke geographically dispersed cluster failover.

The storage management system 50 or environmental information processor 52 can include program code for classifying data stored in the storage array 34 and program code for prioritizing the classes of data. Depending upon the predicted amount of time before the detected threat reaches the storage array 34, the environmental information processor 52 recognizes that the initiated precautionary action may not have sufficient time to complete. Accordingly, the classification and prioritization of the data identifies an order in which to protect the data.

For example, an administrator can establish a policy that places more value on data associated with the database server than with the application servers, and values data associated with email least of all. Within the storage array 34, certain volumes are for storing database data, others are for application data, and still others are for email. When, for example, the precautionary action includes remote replication, the storage management system 50 can start replicating the volumes with the database data first, followed by the volumes with application data, and then those with email data. Thus, if the disaster overcomes the storage array 34 and interrupts the precautionary action, failure to complete the precautionary action affects the data valued less.

Classifying data (or placing data into tiers) can involve a variety of criteria. As another example, data classification can be based on personnel (i.e., the offices or functions held or performed by such personnel). For instance, data associated with the executive officers of an enterprise can receive a higher priority than, for example, human resources. When the available time is short, not every server in the enterprise may be replicated.

If the situation is not urgent, the environmental information processor 52 can determine to use the same prioritization established for urgent replication, or use a different classification and prioritization. For example, if the environmental information processor 52 is not faced with urgently saving the most critical data in the brief remaining moments before disaster strikes, there may be a different preferred order, e.g., because data replication may be more efficient, i.e., based on cost, bandwidth usage, the amount of data that can be protected, etc.

In some implementations, the environmental information processor 52 may need to identify (for the storage management system 50) which storage systems are in harm's way to ensure that an initiated precautionary action involves data that are actually at risk. The environmental information processor 52 may employ a variety of techniques for mapping storage systems to their geographical (or physical) locations. Then, when the environmental information processor 52 receives a message, for example, indicating that the track of a hurricane brings it near the New York City region, the environmental information processor 52 can search for those storage systems within that geographical area and instruct the storage management system 50 to take precautionary action with respect to these storage systems. As another example, each storage system may be equipped with a GPS (Global Positioning System) device that establishes the location of that storage system. The environmental information processor 52 can compare textual longitude and latitude values in incoming warning messages with the GPS locations to identify which storage systems are under threat.

In other implementations, such a mapping is unnecessary because of an unambiguous relationship between the sensors (and/or environmental information processor 52) and specific storage systems. For example, sensors for detecting extreme temperatures (indicative of fire) can be located in the same building or building complex as the storage systems. Any alarm raised by such sensors would implicitly concern these storage systems. As another example, the environmental information processor 52 may receive incoming information from various types of sensors, located locally and remotely. Knowledge of the geographical location of the storage arrays is unnecessary if the environmental information processor 52 is assigned specifically to ensure data protection for one particular storage array (or particular set of storage arrays). Accordingly, the environmental information processor 52 is implicitly configured to invoke a precautionary action for these storage arrays if the incoming information from any one or more of the sensors so warrants.

In addition to invoking a precautionary action, the environmental information processor 52 can issue a command that causes the storage management system 50 to notify an administrator, thereby providing a warning of the approaching threat. Notification can be by any one or more modes of communication, e.g., telephone, email, pagers, Blackberry®, etc. The administrator can assess the threat and override any precautionary action initiated by the storage management system 50 and still in progress (e.g., by stopping or changing the precautionary action).

In its analysis of the incoming information, the environmental information processor 52 may instead determine that an alarm raised by the environment monitoring system 54 is a false alarm, in which case no precautionary action need be taken. For example, a single alarm may be deemed an insufficient basis for invoking a precautionary action. As another example, a thunderstorm watch or advisory may not induce precautionary action, whereas a thunderstorm warning would.

Figure 2:
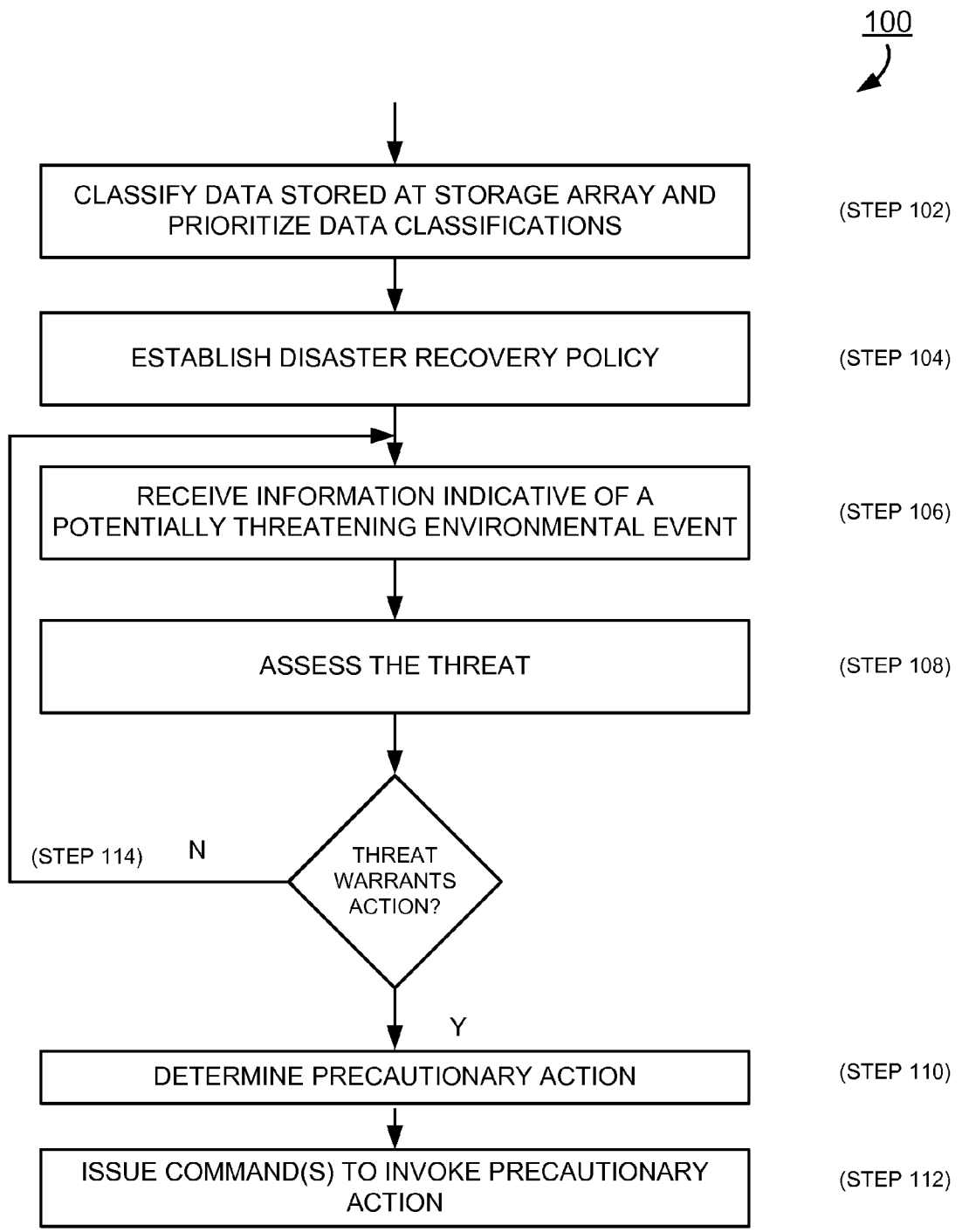
FIG. 2 is a flow diagram of an embodiment of a process for performing data protection as a protective measure against impending potential catastrophic data loss.

FIG. 2 shows an embodiment of an automated process 100 for implementing a data protection mechanism in accordance with the principles of the invention. It is to be understood that some of the steps need not occur in the order described. At step 102, an administrator classifies the data stored at the storage array 34 and prioritizes the data classifications based on the relative importance of each class of data. At step 104, an administrator establishes a disaster recovery policy. The policy sets forth the precautionary actions to be taken in the event of certain types of disaster scenarios. The policy takes into account the established priority among the various data classifications and the severity and urgency of the threat.

At step 106, the environmental information processor 52 receives incoming information (e.g., messages, signals, packets) indicative of a developing potentially threatening environmental condition. The environmental information processor 52 continuously analyzes the incoming information to assess (step 108) the threat. From the incoming information, the environmental information processor 52 operates to determine the type and severity of the threat, identify the storage array 34 exposed to the threat, and estimate the time remaining before the threat impacts the storage array 34. If based on this analysis the environmental information processor 52 considers the threat valid, the environmental information processor 52 determines (step 110) the precautionary action to invoke in accordance with the established policy. The environmental information processor 52 then issues (step 112) one or more commands to the storage management system 50 that invoke the chosen precautionary action (or actions). After the chosen precautionary action completes, the storage management system 50 initiates actions to restore normal, pre-disaster operations at the primary storage array, if the situation allows.

If instead the analysis shows no cause for concern (i.e., a false alarm, incoming data fails to exceed a required threshold, threat is too remote), the environmental information processor 52 refrains (step 114) from initiating any precautionary action, and continues to receive and analyze subsequent incoming information.

Figure 3:
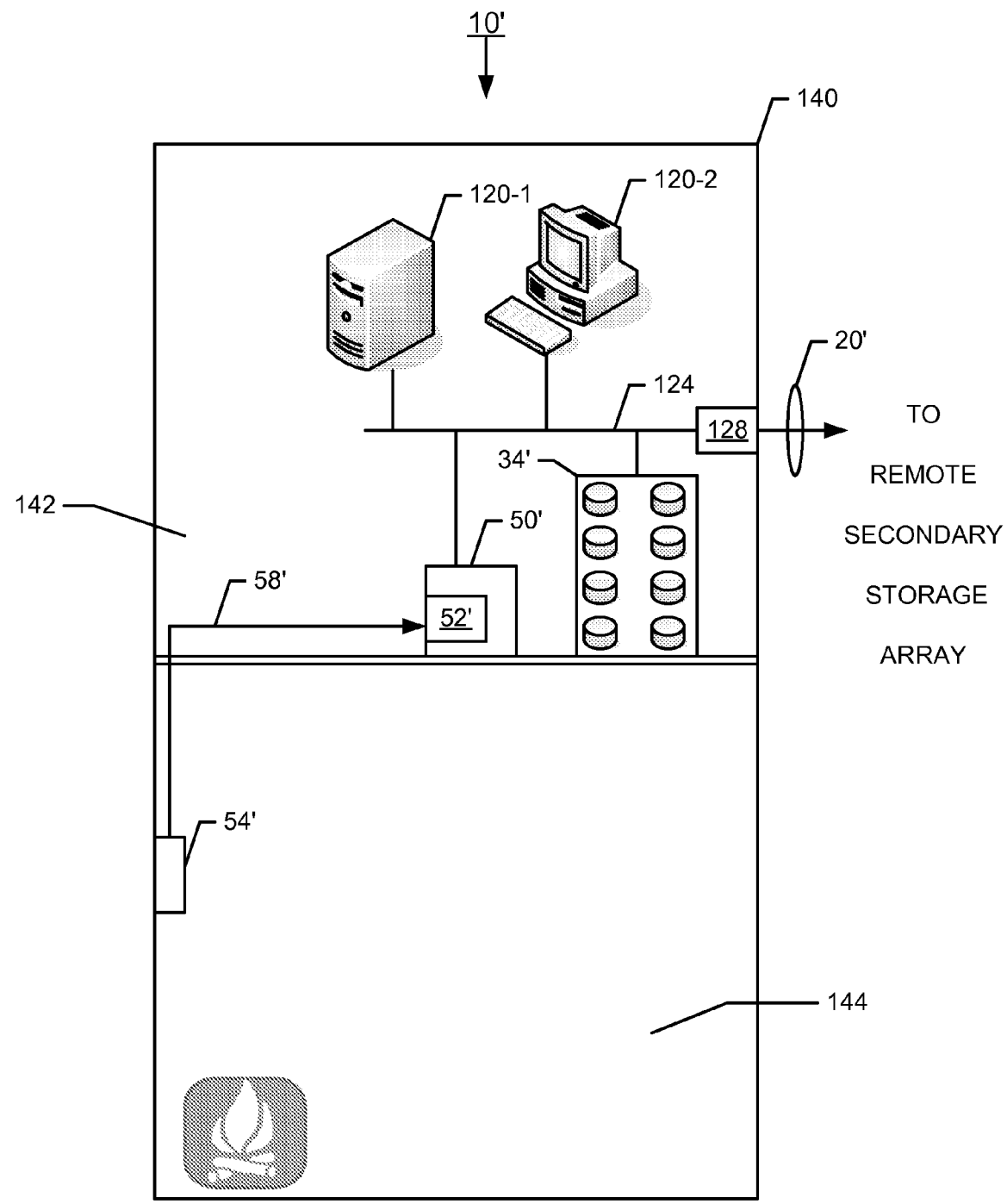
FIG. 3 is a diagrammatic illustration of an exemplary scenario in which one embodiment of a data protection system performs data protection as a protective measure against impending potential catastrophic data loss.

FIG. 3 illustrates an exemplary scenario in which one embodiment of the data protection system 10' protects data stored in a first storage array 34' in response to an environmental trigger. Coupled to a local area network 124 are the storage array 34', representative computing systems 120-1, 120-2, a storage management system 50', and a network interface 128, which are located on a second floor 142 of a building 140. The storage array 34' stores data used by the various computing systems 120-1, 120-2. The storage management system 50' includes an embodiment of an environmental information processor 52'. The environmental information processor 52' is in communication with an environmental monitoring system 54' located on the first floor 144 of the building 140. The environmental monitoring system 54' includes a temperature sensor; the environmental information processor 52' is configured to interpret messages received from the temperature sensor.

During operation, the environmental monitoring system 54' monitors and reports temperature. From these messages (or signals), the environmental information processor 52' detects a rise in temperature. If the temperature is indicative of a developing threat, the environmental information processor 52' issues a command to the storage management system 50' (here, co-resident). The command directs the storage management system 50' to take a precautionary action. The particular precautionary action depends upon the assessment and precautionary action selection made by the environmental information processor 52'. If the environmental information processor 52' concludes from the incoming information that the likely scenario is a failure of the building's air-conditioning system, the invoked precautionary action may be to perform a backup and to power down the storage array 34'. If instead the conclusion is that a fire has broken out and possibly only minutes remain before the fire reaches the second floor, then the precautionary action may be to initiate immediate remote replication of data in the storage array 34, starting with data classified with highest priority. In such an instance, the storage management system 50' initiates commands to forward data from the storage array 34' to a remote secondary storage array through the network interface 128 and over the network 20'. Although each of the devices on network 124 in this example, including the storage array 34', share the network interface 128, in other embodiments the storage array 34' has its own network interface through which to forward data to the remote secondary storage array.

Figure 4:
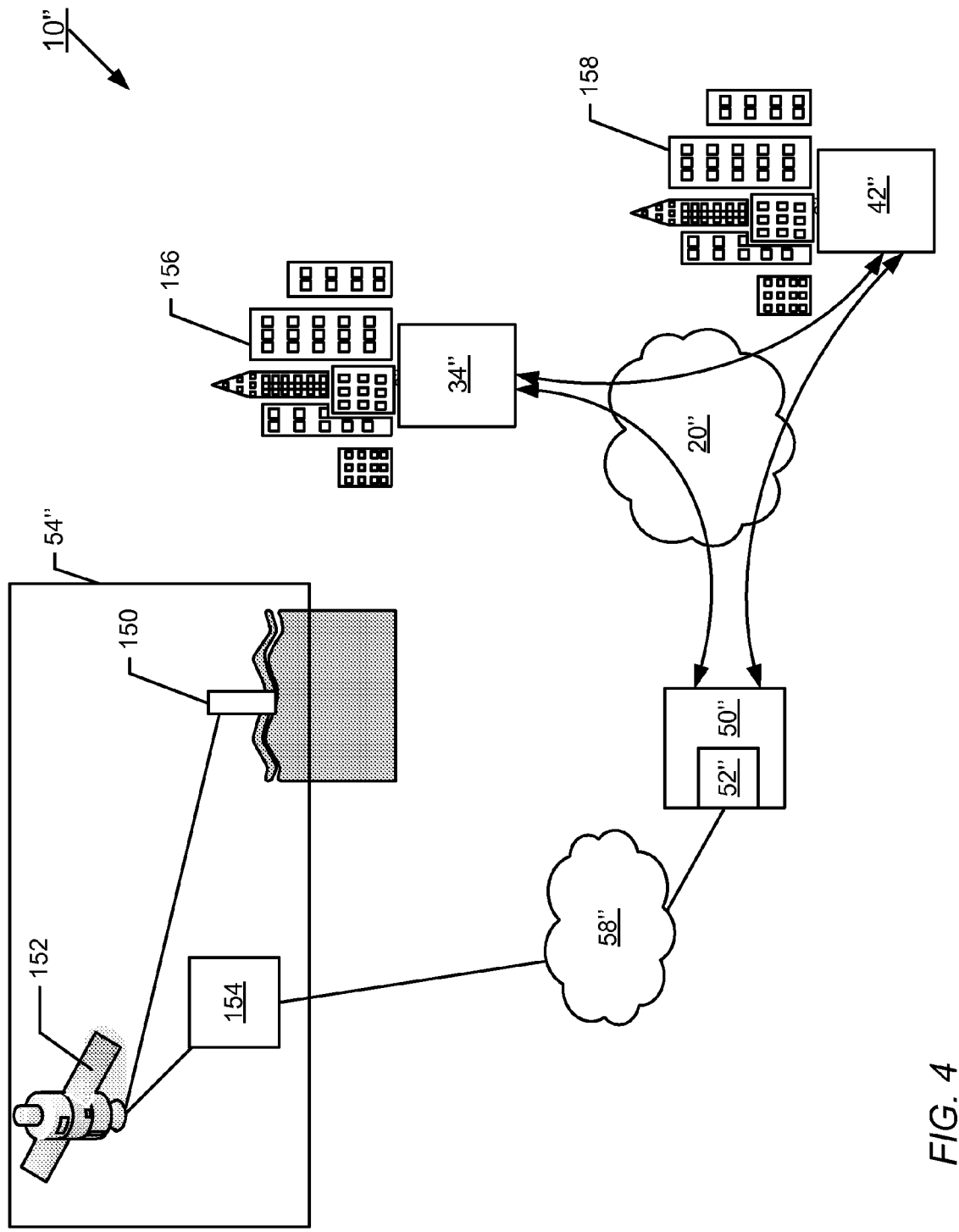
FIG. 4 is another diagrammatic illustration of an exemplary scenario in which another embodiment of a data protection system performs data protection as a protective measure against impending potential catastrophic data loss.

FIG. 4 illustrates another exemplary scenario in which another embodiment of a data protection system 10" protects data stored in a first storage array 34" in response to an environmental trigger. In this example, an environmental monitoring system 54" monitors the sea level for detecting tsunamis. The environmental monitoring system 54" includes at least one sea-level sensor 150 in communication with means 152 for forwarding sensor signals to a tsunami warning system 154. In general, the tsunami warning system 154 analyzes the information gathered from the sea-level sensor 150 and when appropriate issues a warning over the network 58" (e.g., as text messages in an IP packet).

An environmental information processor 52", which in this example is embodied in a storage management system 50", is configured to listen to the network 58" for broadcast messages from the environmental monitoring system 54". The storage management system 50" is in communication with a first storage array 34" located in a first city 156 and with a second storage array 42" located in a second city 158.

During operation, the environmental monitoring system 54" monitors the sea level and broadcasts over the network 58" a warning for various coastal cities, including city 156. The environmental information processor 52" receives and analyzes the warning and determines that one of the coastal cities identified in warning (i.e., city 156) is a member of its protection domain. After identifying each storage array in the city 156 potentially at risk and determining the severity of the threat—including estimating the remaining time before the tsunami reaches landfall—the environmental information processor 52" selects a precautionary action based on established policy. For instance, the established policy for environmental threats that are several hours distant can be to perform remote replication followed by cluster failover. To invoke the precautionary action, the environmental information processor 52" issues commands to the storage management system 50", which coordinates the remote replication between the storage arrays 34", 42" and subsequent cluster failover.

The present invention may be implemented as one or more computer-readable software programs embodied on or in one or more articles of manufacture (a computer, computing system, or computer system, as used herein, being any programmable machine or device that inputs, processes and outputs instructions, commands, or data). The article of manufacture can be, but is not limited to, any one or combination of a floppy disk, a hard disk, hard-disk drive, a CD-ROM, a DVD-ROM, a flash memory card, an EEPROM, an EPROM, a PROM, a RAM, a ROM, or a magnetic tape. Aspects of the present invention may take the form of a computer program product embodied in one or more computer readable storage medium(s) having computer readable program code embodied thereon. In the context of this document, a computer readable storage medium may be any tangible medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Any combination of one or more computer readable storage medium(s) may be utilized. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code. Further, although described predominantly as software, embodiments of the described environmental information processor can be implemented in hardware, software, or a combination thereof.

While the present invention has been shown and described herein with reference to specific embodiments thereof, it should be understood by those skilled in the art that variations, alterations, changes in form and detail, and equivalents may be made or conceived of without departing from the spirit and scope of the invention. For example, in one embodiment of the invention, the environmental information processor can determine that a widespread computer virus attack is in progress (i.e., threatening to infect or already infecting an enterprise's network). The environmental information processor, in this event, can issue commands for which the precautionary action is to suspend replication processes to limit the spread of the virus. Accordingly, the scope of the present invention should be assessed as that of the appended claims and by equivalents thereto.

What is claimed is:

1. A data protection system comprising:
   a storage management system functioning as a centralized management tool through which an administrator accesses and manages storage infrastructure and controls data movement between storage arrays, the storage management system being configured to implement one or more data protection procedures for protecting data stored in a storage array, the data stored in the storage array being classified and prioritized; and
   an environmental information processor receiving information related to an event that poses a threat to the data stored in the storage array, assessing the threat to the data stored in the storage array based on the received information, selecting a precautionary action based on the threat assessment and in accordance with a policy that sets forth different precautionary actions to be taken for different threat assessments, and issuing a command to the storage management system identifying the selected precautionary action, the command causing the storage management system to initiate one or more data protection procedures in order to perform the selected precautionary action identified in the command, wherein the selected precautionary action includes replicating data stored in the storage array to a second storage array in an order determined by the prioritization in response to determining that there is insufficient time to replicate all of the data stored in the storage array.

2. The data protection system of claim 1, wherein the selected precautionary action includes inducing a cluster failover that causes the storage array to become a secondary source for the data and another storage array to become a primary source for the data.

3. The data protection system of claim 1, wherein the selected precautionary action includes notifying an administrator of the event.

4. The data protection system of claim 1, wherein the environmental information processor determines before issuing the command whether the received information is indicative of a false alarm.

5. The data protection system of claim 1, wherein the environmental information processor receives the information from U.S. Geological Survey messages acquired over a network.

6. The data protection system of claim 1, wherein the command issued to the storage management system further identifies each storage array threatened by the event.

7. A computerized method for implementing precautionary data protection for data stored at a storage array situated at a physical location, the computerized method comprising:
   classifying and prioritizing the data stored in the storage array;
   receiving information indicative of an event that may endanger the data stored at the storage array;
   establishing a policy that sets forth different precautionary actions to be taken for different threat assessments;
   assessing a threat posed by the event to the data stored in the storage array based on the received information;
   determining by the threat assessment that insufficient time remains to replicate all of the data stored in the storage array;

selecting a precautionary action based on the assessment of the threat posed by the event and in accordance with the policy, wherein the selected precautionary action includes replicating data stored in the storage array to a second storage array in an order determined by the prioritization in response to determining that there is insufficient time to replicate all of the data stored in the storage array; and issuing a command to a storage management system identifying the selected precautionary action and instructing the storage management system to perform the selected precautionary action.

8. The method of claim 7, wherein the selected precautionary action includes inducing a cluster failover that causes the storage array at the physical location to become a secondary source for the data and a storage array at a second physical location to become a primary source for the data.

9. The method of claim 7, wherein the selected precautionary action includes notifying an administrator of the event.

10. The method of claim 7, further comprising the step of determining whether the received information represents a false alarm before issuing the command.

11. The method of claim 7, further comprising the step of overriding the selected precautionary action.

12. The method of claim 7, wherein assessing the threat posed by the event to the data stored in the storage array includes estimating an amount of time before the event is expected to affect the storage array.

13. The method of claim 7, wherein the command issued to the storage management system further identifies each storage array threatened by the event.

14. A computer program product for implementing data protection for data stored at a storage array situated at a physical location, the computer program product comprising a non-transitory computer readable storage medium having embodied therein computer readable program code comprising:

computer readable program code for classifying and prioritizing the data stored in the storage array;

computer readable program code for processing information received over a network and related to an event that may endanger data stored at the storage array;

computer readable program code for establishing a policy that sets forth different precautionary actions to be taken for different threat assessments;

computer readable program code for assessing a threat posed by the event to the data stored in the storage array based on the received information, including estimating an amount of time before the event is expected to affect the storage array;

computer readable program code for selecting a precautionary action that includes replicating data stored in the storage array to a second storage array in an order determined by the prioritization in response to determining that the estimated time is insufficient to replicate all of the data stored in the storage array; and computer readable program code for issuing a command to a storage management system identifying the selected precautionary action and instructing the storage management system to perform the precautionary action.

15. The computer program product of claim 14, further comprising computer readable program code for determining before issuing the command whether the received information represents a false alarm.

16. The computer program product of claim 14, wherein the command issued to the storage management system further identifies each storage array threatened by the event.

* * * * *